US011215720B2

(12) United States Patent
Wang et al.

(10) Patent No.: US 11,215,720 B2
(45) Date of Patent: Jan. 4, 2022

(54) FULL WAVEFORM INVERSION APPROACH TO BUILDING AN S-WAVE VELOCITY MODEL USING PS DATA

(71) Applicant: CGG SERVICES SAS, Massy (FR)

(72) Inventors: Min Wang, Singapore (SG); Yi Xie, Singapore (SG); Tengfei Wang, Singapore (SG); Adriano Gomes, Houston, TX (US)

(73) Assignee: CGG SERVICES SAS, Massy (FR)

( * ) Notice: Subject to any disclaimer, the term of this patent is extended or adjusted under 35 U.S.C. 154(b) by 1 day.

(21) Appl. No.: 16/870,274

(22) Filed: May 8, 2020

(65) Prior Publication Data

US 2021/0003728 A1 Jan. 7, 2021

Related U.S. Application Data

(60) Provisional application No. 62/869,101, filed on Jul. 1, 2019.

(51) Int. Cl.
*G01V 1/28* (2006.01)
*G01V 1/00* (2006.01)
*G01V 1/30* (2006.01)
*G01V 1/36* (2006.01)

(52) U.S. Cl.
CPC .............. *G01V 1/282* (2013.01); *G01V 1/005* (2013.01); *G01V 1/303* (2013.01); *G01V 1/368* (2013.01)

(58) Field of Classification Search
CPC ........ G01V 1/282; G01V 1/303; G01V 1/005; G01V 1/368
See application file for complete search history.

(56) References Cited

U.S. PATENT DOCUMENTS

| 10,310,123 | B2 | 6/2019 | Xu et al. |
| 2012/0014214 | A1* | 1/2012 | Artman ............... G01V 1/282 367/25 |
| 2017/0168177 | A1 | 6/2017 | Wang et al. |
| 2019/0154857 | A1 | 5/2019 | Wang et al. |

(Continued)

FOREIGN PATENT DOCUMENTS

CN 108845351 A 11/2018

OTHER PUBLICATIONS

Gomes et al. "Improving reflection FWI reflectivity using LSRTM in the curvelet domain," 2018, SEG International Exposition and 88th Annual Meeting, pp. 1248-1252.

(Continued)

*Primary Examiner* — Elias Desta
(74) *Attorney, Agent, or Firm* — Patent Portfolio Builders

(57) ABSTRACT

Methods and apparatuses for processing seismic data acquired with multicomponent sensors build an accurate S-wave velocity model of a surveyed underground formation using a full waveform inversion (FWI) approach. PS synthetic data is generated using approximative acoustic equations in anisotropic media with a P-wave model, a current S-wave velocity model and a reflectivity model as inputs. The current S-wave velocity model is updated using FWI to minimize an amplitude-discrepancy-mitigating cost function that alleviates the amplitude mismatch between the PS observed data and the PS synthetic data due to the use of the approximative acoustic equations.

20 Claims, 7 Drawing Sheets

(56) References Cited

U.S. PATENT DOCUMENTS

2020/0041675 A1* 2/2020 Pedersen ............... G01V 1/282

OTHER PUBLICATIONS

Alkhalifah, T.; "An acoustic wave equation for anisotropic media"; Geophysics, XP055308539; Jan. 1, 2000; pp. 1239-1250.
Extended European Search Report in corresponding/related European Application No. 20 305 552.0 dated Nov. 25, 2020.
Virieux J., et al.; "An overview of full-waveform inversion in exploration geophysics"; Geophysics, US Society of Exploration Geophysicists, vol. 74, No. Suup. of 6; XP001550475; Nov. 1, 2009; pp. WCC1-WCC26.
J. Cheng et al., "Simulating propagation of separated wave modes in general anisotropic media, Part I: qP-wave propagators," Geophysics 2014, pp. C1-C18, vol. 79.
J.W.M. Dankbaar, "Separation of P- and S-Waves," Geophysical Prospecting, 1985, pp. 970-986, vol. 33.
L. Duan et al., "True Amplitude Reverse Time Migration—From Reflectivity to Velocity and Impedance Perturbations," 75th EAGE Conference & Exhibition incorporating SPE EUROPEC 2013, London, UK, Jun. 10-13, 2013, 5 pages.
Leon Thomsen, "Weak elastic anisotropy," Geophysics, Oct. 1986, pp. 1954-1966, vol. 51, No. 10.
M.F. Akalin et al., "3D-PS Converted Waves—Solving 3D-imaging Challenges under Gas Clouds—Offshore Malaysia," 76th EAGE Conference & Exhibition 2014 Amsterdam RAI, The Netherlands, Jun. 16-19, 2014, 5 pages.
Peter Whiting et al., "Prestack Kirchhoff migration and amplitude accuracy," ASEG Extended Abstracts, 2001, DOI: 10.1071/ASEG2001ab093, 5 pages.
Samuel H. Gray et al., "True-amplitude Gaussian-beam migration," Geophysics, Mar.-Apr. 2009, pp. S11-S23, vol. 74, No. 2.
Susan L.M. Miller et al., "The relationship between elastic-wave velocities and density in sedimentary rocks: A proposal," pp. 260-273.
Yu Zhang et al., "True-amplitude, angle-domain, common-image gathers from one-way wave-equation migrations," Geophysics, Jan.-Feb. 2007, pp. S49-S58, vol. 72, No. 1.
Yu Zhang et al., "Velocity and impedance inversion based on true amplitude Reverse Time Migration," SEG Houston 2013 Annual Meeting, DOI http://dx.doi.org/10.1190/segam2013-0581.1, pp. 949-953.

* cited by examiner

FULL WAVEFORM INVERSION APPROACH TO BUILDING AN S-WAVE VELOCITY MODEL USING PS DATA

BACKGROUND

Technical Field

Embodiments of the subject matter disclosed herein generally relate to seismic exploration methods and devices using seismic data acquired with multicomponent sensors and due to P-waves injected in an explored underground formation; more specifically, to building an accurate S-wave velocity model of the explored underground formation from PS data extracted from seismic data.

Discussion of the Background

In recent years, multicomponent surveying has developed rapidly, especially with the quick deployment of ocean bottom seismic (OBS) acquisition. Data recorded by multicomponent sensors (e.g., including three orthogonal geophones or accelerometers) captures seismic wavefields emerging from the surveyed formations more completely than conventional sensors (e.g., single hydrophones, geophones or accelerometers). Note that sensors are sometimes called "receivers" or "detectors." These enhanced data acquisition abilities allow generating PS images resulting from downgoing P- (primary or compressional) waves being converted into upgoing S (secondary or shear) waves at their deepest point of penetration into the surveyed formation. That is, an incident P-wave at a solid-solid interface may generate a reflected P-wave, a transmitted P-wave, a reflected SV wave and a transmitted SV wave. Snell's Law governs the angular relationship between the rays of the resultant waves. SV waves are vertically polarized as opposed to SH waves, which are horizontally polarized. Since SH waves are not generated or detected when a P-wave source is used, the simpler term S-wave is sometimes used for SV waves resulting from converting the P-waves.

S-waves are a useful tool for characterizing the elastic properties of a hydrocarbon reservoir for various reasons, such as, the comparison of P and S reflectivities enables better identification of fluid presence, and S-wave ray paths illuminate targets hidden beneath gas-filled zones. P- and S-waves provide complementary information that is helpful when inverting seismic data for determining elastic parameters of the explored formation's layers.

Generating PS images is challenging because it requires consistent models for both P and S velocities since a P-wave is converted in a S-wave while traveling in the subsurface between the source and the sensor. FWI has proven to be a reliable tool for building accurate P-wave velocity ($V_P$) models, but there is no conventional effective tool for building S-wave velocity ($V_S$) models yet. PP and PS image registration or joint PP and PS tomography are conventionally used for converted S-wave velocity model updates. However, a conventionally obtained PS image is unreliable at shallow depths due to sparse acquisition of typical OBS surveys for PS registration, and tomography has limited resolution to deal with complex lateral velocity variations. $V_S$ model building for S-waves converted from incident P-waves has remained until now an unresolved challenge.

SUMMARY

The various embodiments described in this application provide an FWI-based approach to anisotropic $V_S$ velocity model building using acoustic equations for forward modeling (thereby, preserving kinematic information) and then a modified cost function mitigating the amplitude discrepancy between observed and simulated data.

According to an embodiment, there is a method for seismic exploration that includes obtaining seismic data acquired using multicomponent sensors able to detect P-waves and S-waves emerging from a subsurface formation after P-waves have been injected therein. The method then includes separating PS observed data from the seismic data and generating PS synthetic data using acoustic approximation equations in anisotropic media with a P-wave model, a current S-wave velocity model and a reflectivity model as inputs. The method further includes updating the current S-wave velocity model using a full waveform inversion to minimize an amplitude-discrepancy-mitigating cost function quantifying difference between the PS observed data and the PS synthetic data while alleviating an amplitude mismatch between the PS observed data and the PS synthetic data due to the use of the acoustic approximation equations. The updated S-wave velocity model is then used to assess presence of natural resources in the subsurface formation and/or to assist extraction of the natural resources from the subsurface formation.

According to another embodiment, there is a seismic data processing apparatus having an interface and a data processing unit connected to the interface. The interface is configured to obtain seismic data acquired using multicomponents sensors able to detect P-waves and S-waves emerging from a subsurface formation after P-waves have been injected therein. The data processing unit is configured to separate PS observed data from the seismic data, to generate PS synthetic data using acoustic approximation equations in anisotropic media with a P-wave model, a current S-wave velocity model and a reflectivity model as inputs, and to update the current S-wave velocity model using a full waveform inversion, FWI, to minimize an amplitude-discrepancy-mitigating, ADM, cost function quantifying difference between the PS observed data and the PS synthetic data while alleviating an amplitude mismatch between the PS observed data and the PS synthetic data due to the use of the acoustic approximation equations. The updated S-wave velocity model is usable to assess presence of natural resources in the subsurface formation and/or to assist extraction of the natural resources from the subsurface formation.

According to yet another embodiment, there is a computer-readable recording medium non-transitorily storing executable codes that, when executed by a processor, make the processor perform a method for seismic exploration. The method includes obtaining seismic data acquired using multicomponent sensors able to detect P-waves and S-waves emerging from a subsurface formation after P-waves have been injected therein. The method then includes separating PS observed data from the seismic data and generating PS synthetic data using acoustic approximation equations in anisotropic media with a P-wave model, a current S-wave velocity model and a reflectivity model as inputs. The method further includes updating the current S-wave velocity model using a full waveform inversion to minimize an amplitude-discrepancy-mitigating cost function quantifying difference between the PS observed data and the PS synthetic data while alleviating an amplitude mismatch between the PS observed data and the PS synthetic data due to the use of the acoustic approximation equations. The updated S-wave velocity model is then used to assess presence of natural resources in the subsurface formation and/or to assist extraction of the natural resources from the subsurface formation.

BRIEF DESCRIPTION OF THE DRAWINGS

For a more complete understanding of the present inventive concept, reference is now made to the following descriptions taken in conjunction with the accompanying drawings, in which.

DETAILED DESCRIPTION OF THE INVENTION

Figure 1:
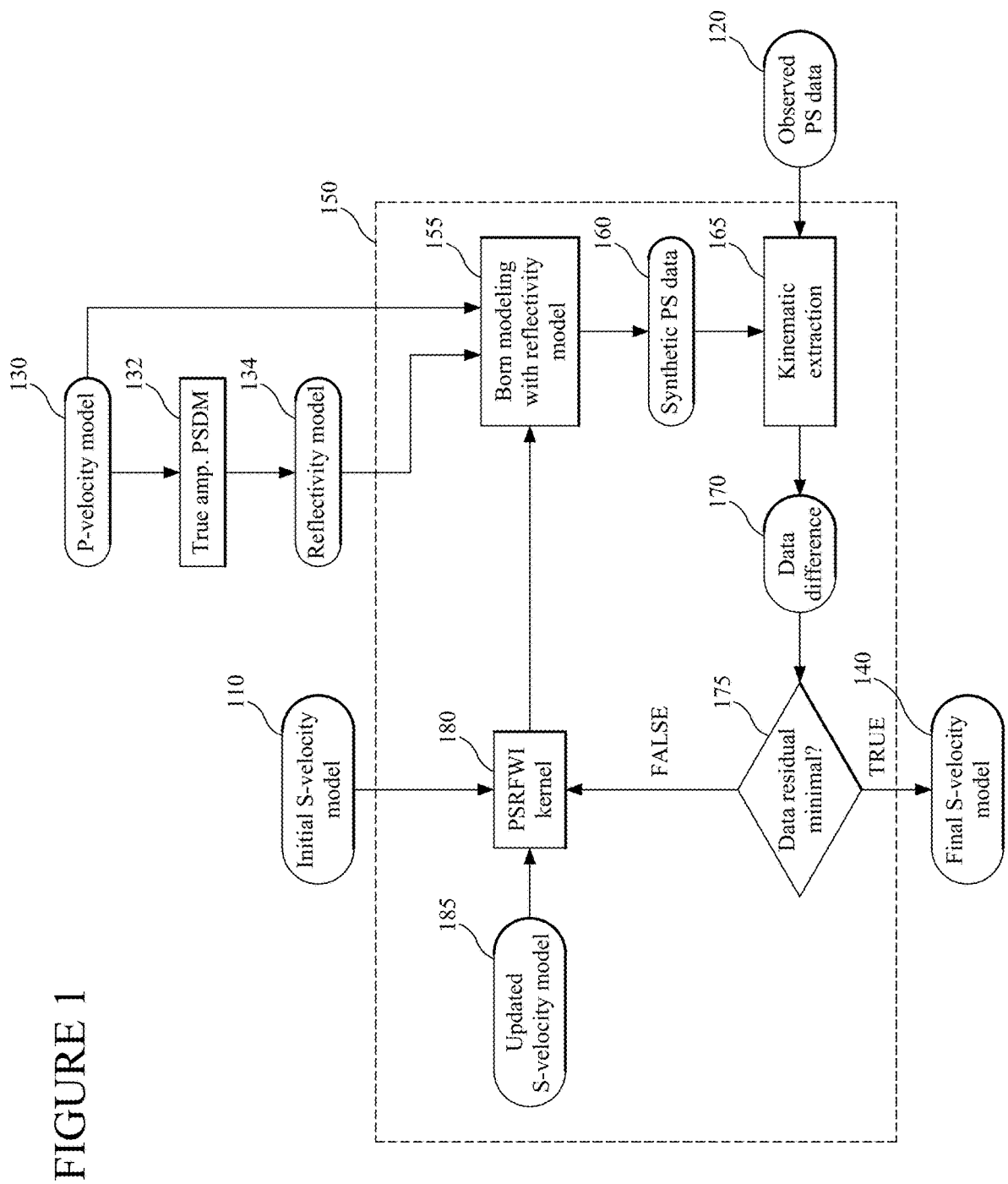
FIG. 1 is a flowchart of a PS-RFWI process according to an embodiment.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed in the context of processing seismic data acquired with multicomponent sensors (enabling detection of both P-waves and S-waves) after P-waves are injected in an explored underground formation.

Reference throughout the specification to "one embodiment" or "an embodiment" means that a particular feature, structure or characteristic described in connection with an embodiment is included in at least one embodiment of the subject matter disclosed. Thus, the phrases "in one embodiment" or "in an embodiment" in various places throughout the specification are not necessarily referring to the same embodiment. Further, the particular features, structures or characteristics may be combined in any suitable manner in one or more embodiments.

The embodiments described in this section provide an FWI approach to generating an S-wave velocity model using PS seismic data. The multicomponent sensors record seismic data related to both P-waves and S-waves emerging from an explored underground formation in which P-waves have been injected (i.e., PP seismic data and PS seismic data). The incident P-waves are partially converted into S-waves at the deepest P-wave penetration reflection point. This approach is named PS-Reflection FWI (PS-RFWI) as it uses PS data (i.e., detected S-waves that have been generated from incident P-waves).

Separating PS data and PP data (i.e., data corresponding to detected S- and P-waves from seismic data acquired with multicomponent sensors after P-waves have been injected into an explored subsurface formation) is a well-known technique. For example, in the article entitled "Separation of P- and S-Waves," by J. W. M. Dankbaar, published in *Geophysical Prospecting* 22, pp. 970-986, in 1985, Dankbaar sets forth a method using a separation filter with the coefficients determined from the near-surface PP and PS wave velocity and from the geometry of detecting geophone groups. Another article ("3D-PS Converted Waves—Solving 3D-imaging Challenges under Gas Clouds—Offshore Malaysia" by Akalin et al, published in 76th *EAGE Conference & Exhibition,* 2014) sets forth a practical flow for processing multicomponent sensor data acquired using ocean bottom sensors that use the fact that the S-waves often arrive at the surface nearly vertically, so that the near surface of the Earth acts as a natural P-wave versus S-wave separation filter. The PS data is then obtained from X and Y acceleration components subjected to tilt corrections, and then geometry rotations yielding radial and transverse motion components. The transverse component, which has very weak energy, is discarded and the radial component corresponding to detected S-waves is processed through noise attenuation, shear-wave statistics, demultiple, etc. The articles cited in this paragraph are incorporated by reference.

FIG. 1 is a flowchart of a PS-RFWI process according to an embodiment. The PS-RFWI process has as inputs an initial S-velocity model 110, observed PS data 120, and a P-velocity model 130. The initial S-velocity model may be the result of one of the conventional methods mentioned in the background section or any other suitable approximation. Observed PS data has been separated from a seismic dataset acquired with multicomponent sensors as previously discussed. P-velocity model 130 may have been obtained, for example, by applying FWI to observed PP data separated from the same seismic dataset as observed PS data 120. However, P-velocity model 130 may also be the result of previously acquired seismic data or otherwise obtained.

P-model velocity 130 is used to build a reflectivity model 134 by applying a true amplitude pre-stack depth migration (PSDM) method 132. Suitable methods of true amplitude PSDM include, for example, Kirchhoff true amplitude PSDM (described, e.g., by P. Whiting et al. in a 2001 article entitled, "Prestack Kirchhoff migration and amplitude accuracy," published as an Extended Abstract, ASEG 2001, Brisbane, pp. 1-4), one-way wave-equation true amplitude PSDM (described, e.g., by Y. Zhang et al. in a 2007 article entitled, "True-amplitude, angle-domain, common-image gathers from one-way wave-equation migrations," published in *Geophysics* 72, No. 1, pp. S49-S58), controlled beam migration (CBM) true amplitude PSDM (described, e.g., by S. Gray et al. in a 2009 article entitled, "True-amplitude Gaussian-beam migration," published in *Geophysics* 74, No. 2, S11-S23), and reverse time migration, RTM, true amplitude PSDM (described, e.g., by Y. Zhang et al. in a 2013 article entitled, "Velocity and impedance inversion based true amplitude reverse time migration," published as an Extended Abstract in SEG 2013, pp. 949-953). All the papers mentioned in this paragraph are incorporated herewith by reference in their entirety.

Rectangle 150 in FIG. 1 emphasizes a portion of the PS-RFWI process that may be performed iteratively to minimize the difference between observed PS data 120 and synthetic data 160. Synthetic data 160 is generated at each iteration using Born modeling with reflectivity model, step 155, which receives as inputs: a current S-velocity model provided by PS-RFWI kernel 180, P-velocity model 130 and reflectivity model 134. The current S-velocity model is initial model 110 at the first iteration and an updated velocity model 185 at following iterations. The theoretical basis of Born modeling with reflectivity model is introduced below.

Anisotropic wave propagation with acoustic approximation uses the wave equation. The subsurface of the Earth can be considered an anisotropic elastic media under the elastodynamic assumption (i.e., motion determined by linear elasticity). Seismic wave's propagation in such media is governed by the wave equation:

$$\rho \frac{\partial^2 u_i}{\partial t^2} - \frac{\partial}{\partial x_j}\left[c_{ijkl}\frac{\partial u_k}{\partial x_l}\right] = f_i \qquad (1)$$

where $u_i$ and $f_i$ are the i-th components of the particle displacement vector and the body force, respectively, $\rho$ is the density, and $c_{ijkl}$ is the ijkl-th component of the stiffness tensor, with indices i, j, k, l taking values between 1 and 3, and Einstein's summation convention over repeated indices being implied.

Wave phenomena (such as transmission and reflection) in an anisotropic media are described by elastic wave equation (1) with P- and S-wave modes intrinsically coupled. However, since the P- and SV-waves are not generally polarized parallel and perpendicular to the wave vector, they are called quasi-P (qP) and quasi-S (qS) waves as discussed in the article entitled "Weak elastic anisotropy," by Thomsen, L. published in Geophysics, Vol. 51, pp. 1954-1966, 1986, which is incorporated herewith by reference.

The complex wave modes in the elastic wavefields, as well as the expensive computation cost, make it quite difficult to use the elastic wave equation (1). In order to save the computational cost, seismic data processing uses the acoustic approximation instead of equation (1). The article entitled "Simulating propagation of separated wave modes in general anisotropic media, Part I: qP-wave propagators," by J. Cheng et al., published in *Geophysics* 79, pp. C1-C18, 2014 (article which is incorporated herewith by reference), shows obtaining an acoustic wave equation in vertically transverse isotropic (VTI) media with shear wave velocity set to zero (see equation 23 therein):

$$\frac{1}{V_p^2}\frac{\partial^2}{\partial t^2}\vec{P} = \qquad (2)$$

$$\rho\begin{pmatrix} 1+2\epsilon & \sqrt{1+2\delta} \\ \sqrt{1+2\delta} & 1 \end{pmatrix}\begin{pmatrix} \partial_x^T\frac{1}{\rho}\partial_x + \partial_y^T\frac{1}{\rho}\partial_y & 0 \\ 0 & \partial_z^T\frac{1}{\rho}\partial_z \end{pmatrix}\vec{P} + \vec{F}$$

where $\vec{P}$ is the vector stress wavefield including horizontal and vertical components, $\partial_i$ (i=x, y, z) is spatial derivative along the i-th direction, $\vec{F}$ is the vector source term, $\epsilon$ and $\delta$ are the Thomsen parameters (introduced in the above-cited Thomsen article). This acoustic approximation can provide a kinematically correct anisotropic wavefield, which is accurate enough for most cases. For weak anisotropy cases, the q-SV wave also can be described by equation (2) with a set of equivalent Thomsen parameters: $V'_p = V_s$, $\epsilon' = 0$ and $\delta' = (\epsilon - \delta)(V_p/V_s)^2$, where $V_s$ is the vertical shear wave velocity. The q-P and q-SV propagators are used in the context of PS-RFWI.

Returning now to FIG. 1, data difference 170 between synthetic PS data 160 and observed PS data 120 is based on kinematic extraction 165. The theoretical basis of step 165 is detailed below.

Synthetic PS data simulates incident P-wave converted into S-wave at an interface. U.S. Pat. No. 10,310,123, which is incorporated herewith by reference, describes an FWI-based technique of updating a velocity model that splits the velocity model into a reference (also known as "background") model $m_0$ and a perturbation model $\delta m$. PS-RFWI uses a similar approach. Three model parameters describe the Born approximation of PS data: smooth background model of P- and S-wave velocity $V_{p0}$, $V_{s0}$, and a model perturbation $\delta m$.

Deriving PS data using equation (1) for a true amplitude Born modeling is too complicated for practical reasons. However, a good enough Born approximation of the amplitudes may be obtained using equation (2). The incident P-wave, P, propagates in the background model $V_{p0}$ according to $$\frac{1}{V_{p0}^2}\frac{\partial^2}{\partial t^2}P = \qquad (3)$$

$$\rho\begin{pmatrix} 1+2\epsilon & \sqrt{1+2\delta} \\ \sqrt{1+2\delta} & 1 \end{pmatrix}\begin{pmatrix} \partial_x^T\frac{1}{\rho}\partial_x + \partial_y^T\frac{1}{\rho}\partial_y & 0 \\ 0 & \partial_z^T\frac{1}{\rho}\partial_z \end{pmatrix}P + \vec{F}.$$

If this incident wavefield encounters a perturbation $\delta m$, a secondary source $$\delta F(x,t) = P(x,t)\delta m(x) \qquad (4)$$

is ignited and a scattered S-wave (S) is generated and propagates in the background model $V_{s0}$ according to $$\frac{1}{V_{s0}^2}\frac{\partial^2}{\partial t^2}S = \qquad (5)$$

$$\rho\begin{pmatrix} 1+2\epsilon' & \sqrt{1+2\delta'} \\ \sqrt{1+2\delta'} & 1 \end{pmatrix}\begin{pmatrix} \partial_x^T\frac{1}{\rho}\partial_x + \partial_y^T\frac{1}{\rho}\partial_y & 0 \\ 0 & \partial_z^T\frac{1}{\rho}\partial_z \end{pmatrix}S + \delta F(x,t).$$

Equation (4) is not the exact formula for S-wave Born approximation. Therefore, the energy and scattering pattern of the secondary source differs from the true one. Thus, the forward modeled synthetic PS data does not have the same amplitudes as observed PS data. However, the demigration process based on equations (3)-(5) preserves the correct kinematic information of PS reflections.

The PS-RFWI updates the S-velocity model using PS data by minimizing a cost function. The generalized PS-RFWI cost function $J_{REF}$ (the Born approximation being used to generate the PS synthetic data) is:

$$J_{REF}(m_0,\delta m) = (\|\Delta(\delta d, \delta d_{cal}(m_0,\delta m))\|_\gamma)^n \qquad (6)$$

where $\delta d$ represents observed PS data, while $\delta d_{cal}$ represents the synthetic PS data modeled from the input P-velocity, S-velocity and reflectivity models using equations (3)-(5) above. "$\Delta$" indicates the difference between the synthetic and observed PS data, $\gamma$ is the residual norm and n an arbitrary power.

A particular form of $J_{REF}$ is the cost function used in the conventional least-squares FWI:

$$J_{LS}(m_0,\delta m) = \|\delta d - \delta d_{cal}(m_0,\delta m)\|_2^2 \qquad (7)$$

As the amplitude is unreliably reproduced when the acoustic approximation is used, $J_{LS}$ may lead to severe errors during the inversion. Recently, other cost functions have been proposed. For example, a cost function $J_{TT}$ minimizes travel-time differences ($\Delta\tau$) between observed and synthetic PS data:

$$J_{TT}(m_0, \delta m) = \|\Delta\tau(\delta d, \delta d_{cal}(m_0, \delta m))\|_2^2. \quad (8)$$

Cost function $J_{TT}$ has good convexity to avoid the local minima during inversion, but its resolution and convergence rate is less than for the least-square cost function $J_{LS}$.

Another cost function $J_{WD}$ that aims to mitigate amplitude mismatch is using warped data:

$$J_{WD}(m_0, \delta m) = \|\delta d'(t + \Delta\tau(\delta d, \delta d_{cal}(m_0, \delta m))) - \delta d_{cal}(m_0, \delta m)\|_2^2 \quad (9)$$

where $\delta d'(t + \Delta\tau(\delta d, \delta d_{cal}(m_0, \delta m)))$ is an intermediate dataset generated by warping the synthetic data with a time shift $\Delta\tau(\delta d, \delta d_{cal}(m_0, \delta m))$ between the synthetic and real data. The time shift $\Delta\tau(\delta d, \delta d_{cal}(m_0, \delta m))$ can be determined, for example, using the dynamic warping method as described in the article entitled "Dynamic warping of seismic images" by D. Hale published in *Geophysics*, Vol. 78, no. 2, pp. S105-S115, 2013 (which is incorporated by reference), or a cross-correlation approach. The cost function $J_{WD}$ yields a better resolution and has a faster convergence rate than the cost function $J_{TT}$ without being affected by the amplitude mismatch.

Since RFWI aims to update the reference/background models (e.g., $V_{s0}$, $V_{p0}$, $\delta'$), the gradient may be calculated by simply taking the derivative of the cost function with respect to a respective background/reference model $m_0$:

$$\frac{\partial J}{\partial m_0} = \int_{t=0}^{tmax} \left( \frac{\partial d_{cal}(m_0, \delta m)}{\partial m_0} \delta R(m_0, \delta m) + \frac{\partial \delta d_{cal}(m_0, \delta m)}{\partial m_0} R(m_0, \delta m) \right) dt \quad (10)$$

where J can be any one of the cost functions in equations (6)-(9), and adjoint wavefield R is the residual measured by the cost function, for example, the residual is $R = \delta d'(t + \Delta\tau(\delta d, \delta d_{cal}(m_0, \delta m))) - \delta d_{cal}(m_0, \delta m)$ in equation (9) for PS-RFWI. The quantity SR represents the scattered adjoint wavefield and is obtained by demigration of the adjoint wavefield, R. The cross-correction between source side wavefield's derivative and receiver side wavefield is achieved by integration over time t up to the maximum record time tmax.

In the PP-RFWI, each term of the gradient in equation (10) forms one side of the tomographic gradient (the so-called "rabbit ears" that are two branches in a graph representing the gradient in a vertical slice through the surveyed formation as in FIG. 6D of U.S. Pat. No. 10,310,123). In PS-RFWI, it is assumed that the P-wave processing has been completed, that is, $V_{p0}$ and PP reflectivity are accurate enough and fixed. This assumption means that only $V_{s0}$ is updated, and the first term of equation (10) is zero because P side wavefield of $d_{cal}$ is not related to $V_{s0}$ according to equation (3). The second term, $\delta d_{cal}(m_0, \delta m)$ is the modeled PS data, which is only related to S-wave propagation in equation (5). Equation (10) then becomes:

$$\frac{\partial J}{\partial V_{s0}} = \int_{t=0}^{tmax} \frac{\partial \delta d_{cal}(V_{s0}, \delta m)}{\partial V_{s0}} R(V_{s0}, \delta m) dt. \quad (11)$$

Equation (11) means that only the S-side rabbit ear $V_{s0}$ (in a graph of gradient in a vertical slice through the surveyed underground formation mentioned above) is updated. In fact, the S-side rabbit ear represents the S-wave path where S-velocity changes affect the travel-time of S-wave. Therefore, it is important to single out the S-wave path for gradient calculation during the PS-RFWI. The anisotropic parameter of S-wave, $\delta'$, can be similarly updated using the following gradient:

$$\frac{\partial J}{\partial \delta'} = \int_{t=0}^{tmax} \frac{\partial \delta d_{cal}(V_{s0}, \delta', \delta m)}{\partial \delta'} R(V_{s0}, \delta', \delta m) dt. \quad (12)$$

Similarly, if S-wave velocity may be considered fixed and one focuses on the P-side wave path, the P-wave velocity model may be updated using:

$$\frac{\partial J}{\partial V_{p0}} = \int_{t=0}^{tmax} \frac{\partial \delta d_{cal}(V_{p0}, \delta m)}{\partial V_{p0}} \delta R(V_{p0}, \delta m) dt. \quad (13)$$

Returning again to FIG. 1, synthetic data 160 and observed data 120 kinematically matched at 165 yield data differences 170, that is, a cost function. As discussed above, an amplitude-discrepancy-mitigating (ADM) cost function that quantifies difference between the PS observed data and the PS synthetic data while alleviating an amplitude mismatch between the PS observed data and the PS synthetic data due to the use of the acoustic approximation equations is used. If, at 175, it is determined that cost function representing data residuals is a minimum according to a predetermined criterion (i.e., "TRUE" branch on 175), then the final S-velocity model 140 is output. The predetermined criterion may be that the ADM cost function is less than a threshold or that its decrease from a previous iteration is less than a certain value. Alternatively, a predetermined number of iterations may be performed (i.e., the predetermined criterion is whether the current number of iterations equals the predetermined number of iterations).

If, however, at 175 it is determined that the ADM cost function can or should be further minimized, then PS-RFWI kernel 180 generates an updated S-velocity model 185 using the ADM cost function's derivative calculated according to formula (11) as further discussed below. The PS-RFWI kernel 180 then provides the updated S-velocity model 185 to step 155, where synthetic PS data 160 is regenerated for the next iteration.

A short wavelength component of the velocity model or reflectivity is required to simulate the mode conversion at the sharp boundary (i.e., an interface where P-wave velocity changes suddenly and significantly) in the demigration process. In conventional PP-RFWI, the PP image (i.e., P-velocity model) generated by, for example, reverse time migration is used for reflectivity. In PS-RFWI, the reflectivity may be based on either the PP image or the PS image. The PP image is preferred for obtaining reflectivity for the following reasons. First, PS data has quite limited illumination at shallow section because the S-wave velocity is slow (i.e., the PS image is inaccurate and has poor continuity in the shallow part, migration swings being concentrated around the receiver node), which makes the PS data demigration quite difficult. Second, P-wave processing can provide a good Vp model and well-located PP image, making it possible to mitigate the ambiguity of depth and velocity in the PS reflection data inversion (unlike in the PP-RFWI where the ambiguity of the depth and velocity are quite hard to resolve). FIG. 1 illustrates an embodiment in which reflectivity is extracted from the PP image (i.e., P-velocity model) and remains the same at all the iterations. However, another embodiment may initially use the reflectivity is extracted from the PP image, but then at each iteration to extract reflectivity (to be used a next iteration) from an updated PS image.

Figure 2A:
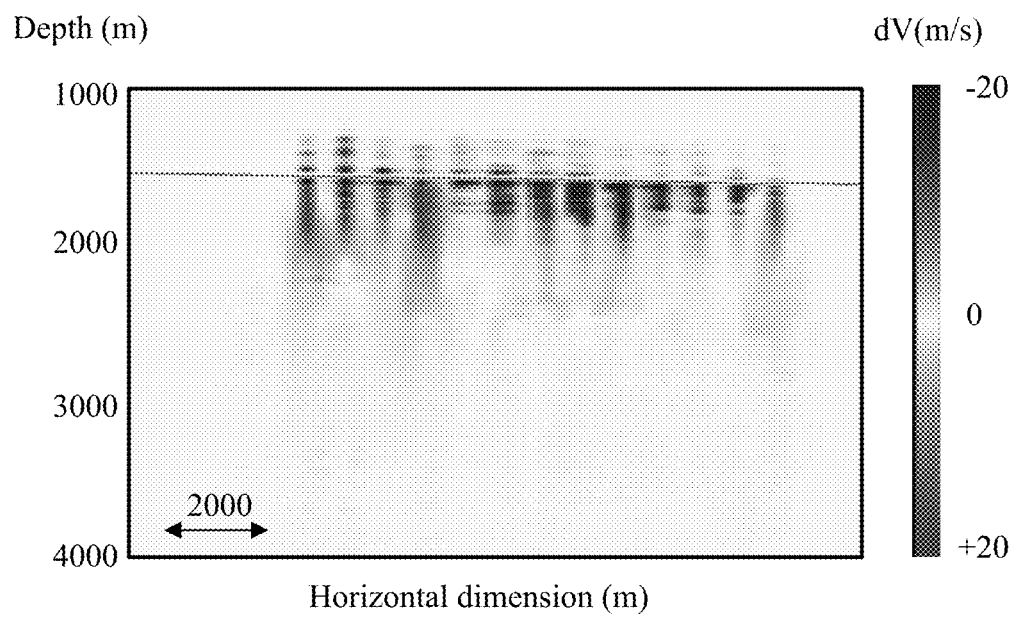
FIG. 2(a) illustrates a gradient used to update the S-wave velocity model in a vertical slice before interpolation.
Figure 2B:
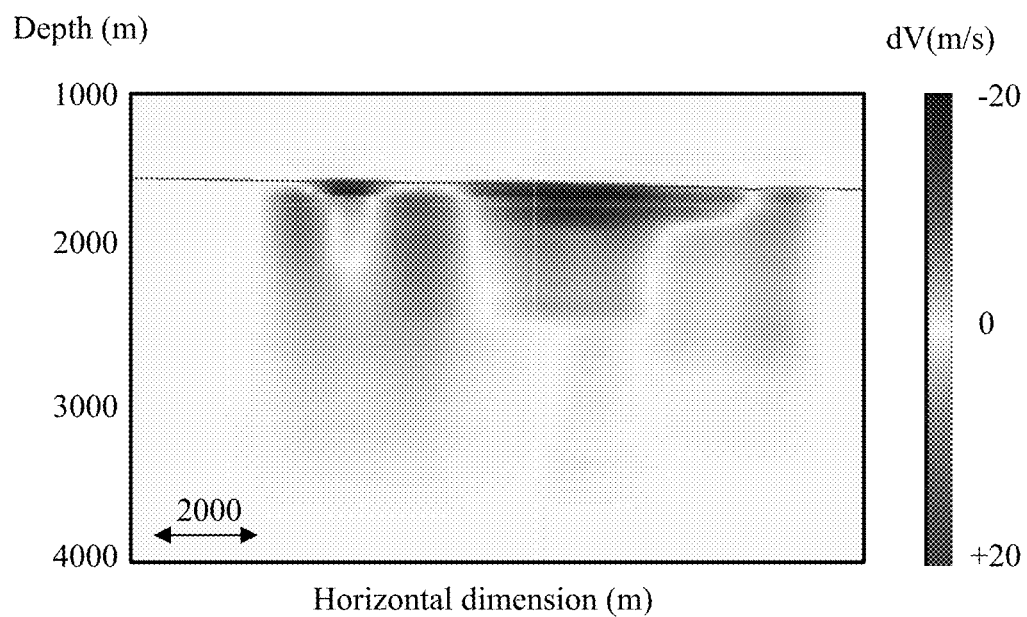
FIG. 2(b) illustrates the gradient after interpolation.

Some embodiments of PS-RFWI are enhanced by using gradient interpolation as now explained. The S-wave is very slow near the water bottom. According to Snell's law, the S-wave's angle in these places is also very small, the S-wave propagating in the shallows close to the water bottom is nearly vertical. Therefore, the PS data provides very limited illumination in these regions, causing a poor horizontal resolution of S-wave model building. To avoid the stripy gradient as in FIG. 2(*a*), a gradient interpolation is performed to fill the gaps between the receiver nodes. The interpolation window length is determined by the receiver spacing and the model grid size used during the inversion. A sinc function-based interpolation may be used to spread the gradient into a smoothed version as illustrated in FIG. 2(*b*) to mitigate this illumination problem. FIGS. 2(*a*) and 2(*b*) are vertical slices with depth on the vertical axis and a horizontal offset on the horizontal axis, the cost function's gradient being represented as nuances of gray.

Figure 3A:
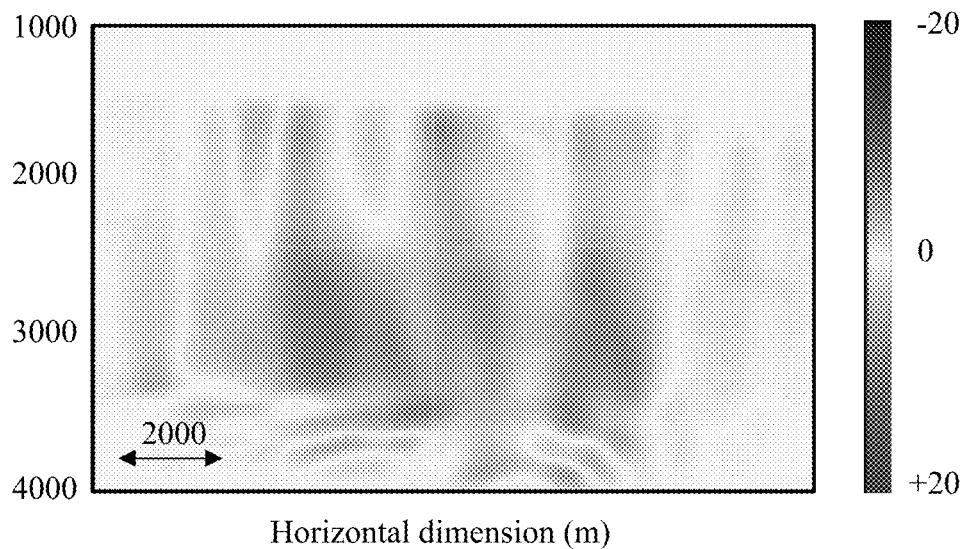
FIGS. 3(a) and 3(b) illustrate gradient calculations using different preconditioners.
Figure 3B:
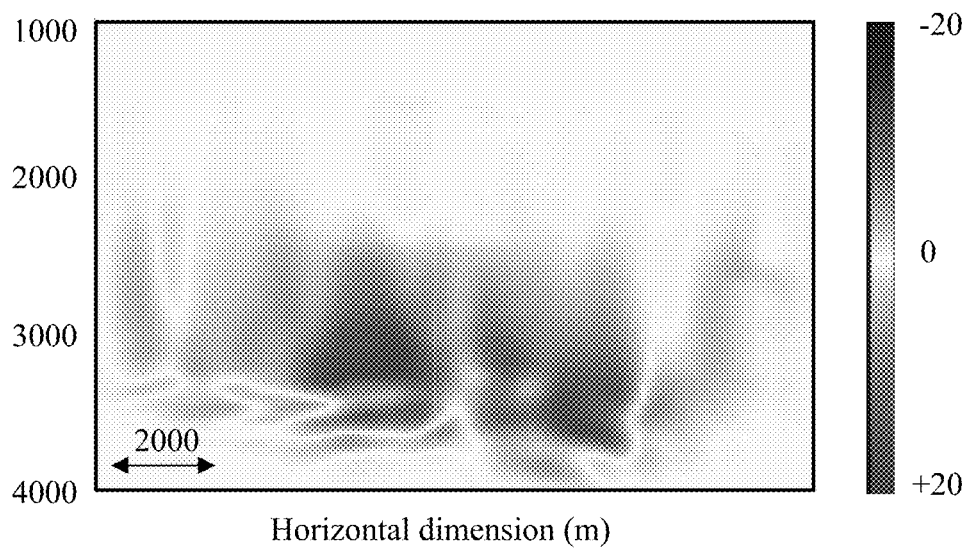

Another improvement of PS-RFWI may be achieved by using a preconditioner. As known from PP-RFWI, a preconditioner may speed up convergence of the inversion. The precondition used in PP-RFWI links the gradient to the source illumination, making the pseudo Hessian to weight more on the deeper part during inversion as described in Gomes et. al.'s article entitled "Improving reflection FWI reflectivity using LSRTM in the curvelet domain" published in 2018 SEG International Exposition and 88$^{th}$ Annual Meeting, pp. 12481252, which is incorporated herewith by reference. However, the gradient of RFWI requires a demigration process. In equation (11), the cross-correlation involves the adjoint wavefield R and the scattered wavefield $\delta d_{cal}$. Here, R decreases from the shallow to deep part, while $\delta d_{cal}$ increases from the shallow to deep part. Since the RFWI gradient is a combination of these two different diverging wavefields, the one-side illumination (source or receiver side) is not effective to increasing weigh for deeper layers of the S-wave velocity model. Therefore, different preconditioners are employed to amplify the deep part gradient. For example, a preconditioner H may be used to amplify the deep part of the gradient, resulting in a preconditioned gradient g according to the following formulas:

$$H = \int_{t=0}^{tmax} \left| \frac{\partial \delta d_{cal}(V_{s0}, \delta m)}{\partial V_{s0}} \right|^n |R(V_{s0}, \delta m)|^2 dt \qquad (14)$$

and $$g = \frac{\int_{t=0}^{tmax} \frac{\partial \delta d_{cal}(V_{s0}, \delta m)}{\partial V_{s0}} R(V_{s0}, \delta m) dt}{H + \sigma} \qquad (15)$$

where n>0 may be a fraction (the larger value of n, the stronger the weighting on the deep part), | | indicates the absolute value of the wavefield and σ is a small-value added to stabilize g's denominator. Preconditioners calculated with increasing values of n may be applied in different iterations, thereby simulating a layer-stripping strategy. FIGS. 3(*a*) and (*b*) illustrate gradient (represented as nuances of gray) calculations in vertical slices having 4,000 m depth and about 10,000 m horizontal range in the explored underground formation. A preconditioner corresponding to n=1 was used for the gradient calculation illustrated in FIG. 3(*a*), and a preconditioner corresponding to n=2 was used for the gradient calculation illustrated in FIG. 3(*b*).

Figure 4:
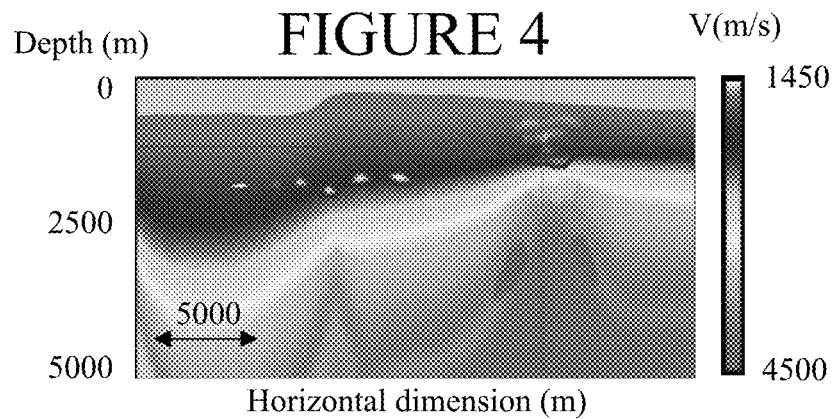
FIGS. 4-7 represent models and reflectivities characterizing synthetic OBS data used to test the PS-RFWI approach.
Figure 5:
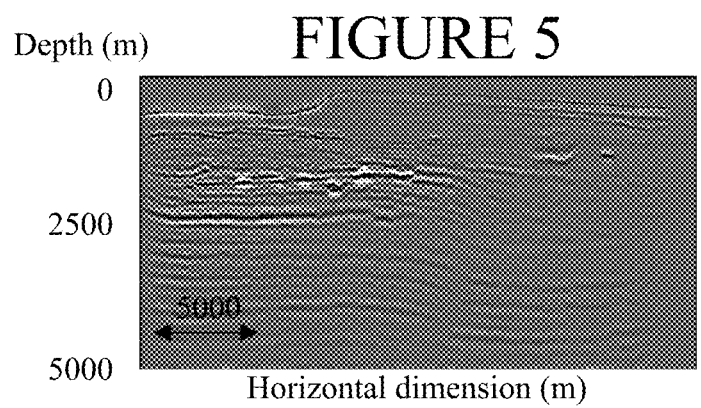
Figure 6:
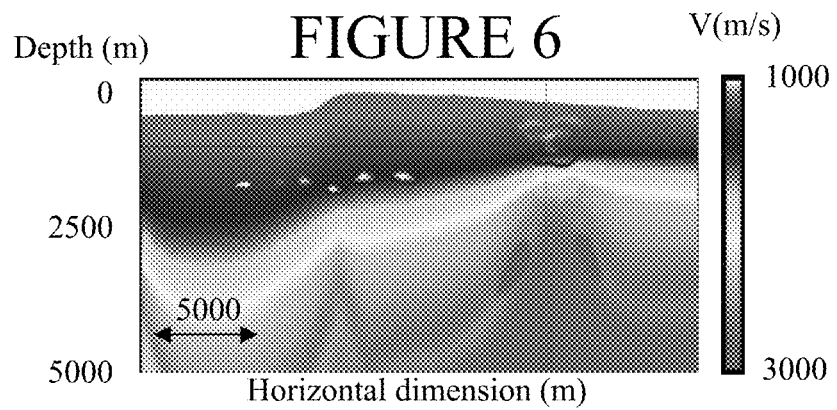
Figure 7:
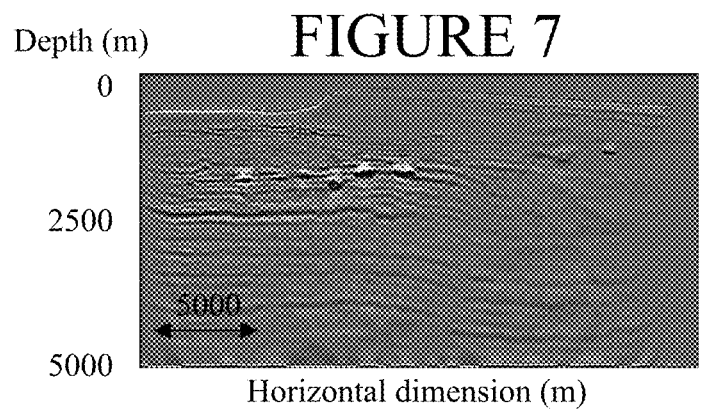

The above-described approach was tested on synthetic OBS data. The synthetic test data is characterized by FIGS. 4-7, which are vertical slices of 5,000 m depth and about 20,000 m horizontal range. FIG. 4 illustrates the P-wave velocity between 1,450 to 4,500 m/s illustrated as nuances of gray, and FIG. 5 is the reflectivity (i.e., PP RTM image) corresponding to FIG. 4. FIG. 6 illustrates the S-wave velocity between 1,000 to 3,000 m/s illustrated also as nuances of gray (yet different nuances correspond here to different values than in FIG. 4), and FIG. 7 is the reflectivity (i.e., PS RTM image) corresponding to FIG. 6.

Figure 8:
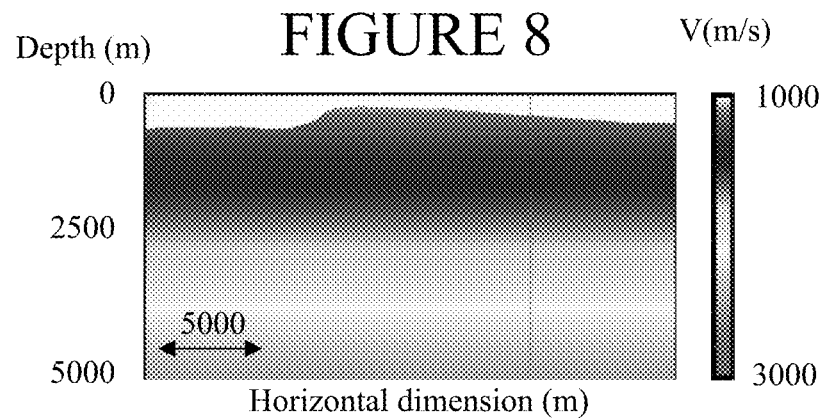
FIG. 8 illustrates the initial S-wave velocity model.
Figure 9:
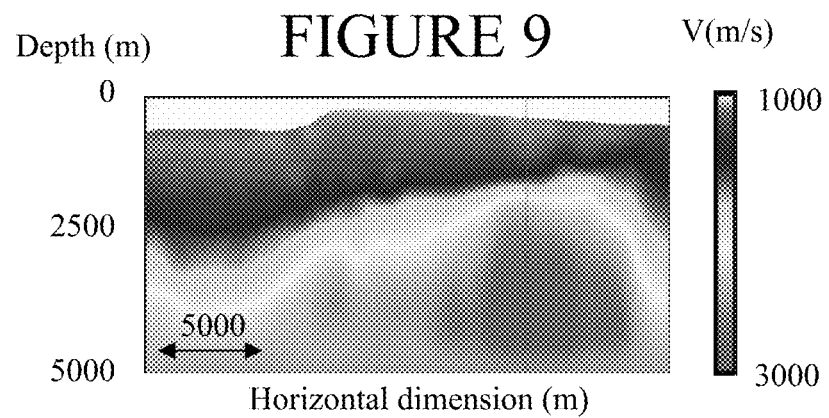
FIG. 9 represents the S-wave velocity model obtained using the PS-RFWI approach.
Figure 10:
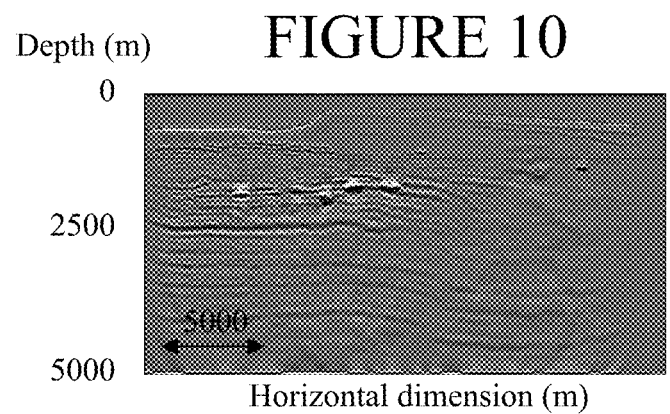
FIG. 10 represents reflectivity obtained using PS RTM based on the PS-RFWI results.

Then starting from an initial S-wave velocity model as illustrated in FIG. 8, the S-wave velocity model in FIG. 9 with a reflectivity (PS RTM image) as illustrated in FIG. 10 is obtained using the above-described PS-RFWI.

Thus, the PS-RFWI methods described in this section generate an S-wave velocity (Vs) model of an explored subsurface using PS data corresponding to the part of P-waves converted by reflection into S-waves. The anisotropic parameter of the S-wave (δ') may also be updated during the same inversion. Conversely, once the S-wave velocity model and a corresponding reflectivity image are available, the P-wave velocity model (and possible also the anisotropic parameter of the P-wave, δ) may be updated while keeping the S-wave part fixed.

Using acoustic equations (equation (3)-(5)) for forward modeling of PS data preserves correct kinematic information although not correct amplitude compared to the real PS data. A cost function minimizing the travel-time difference (Δτ) between the observed and modeled data may be used to mitigate the incorrect amplitude issue. Alternatively, this issue may be alleviated by minimizing waveform misfit between warped synthetic data and original synthetic PS data. The former mitigation strategy (time lag minimization) has good convexity to avoid local minima during inversion but less resolution and a slower convergence rate than the latter strategy using a waveform-based cost function.

The very limited illumination of PS data in the shallow part is mitigated by gradient interpolation to fill the gaps between the receiver nodes, thereby avoiding the stripy gradient and/or poor horizontal resolution of S-wave model building.

Figure 11:
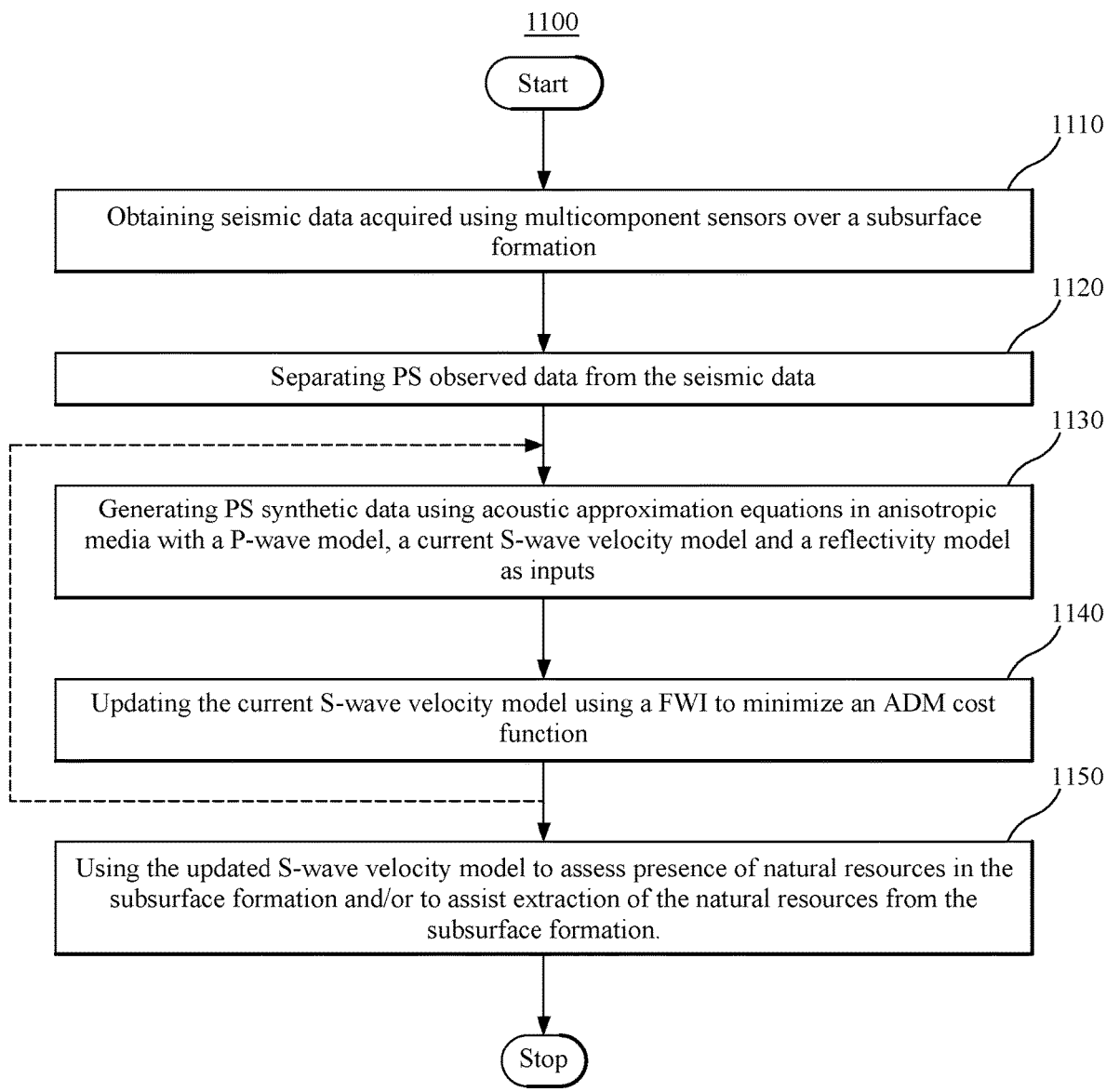
FIG. 11 is flowchart of a method according to an embodiment.

FIG. 11 is a flowchart of a method 1100 for seismic exploration according to an embodiment. Method 1100 includes obtaining seismic data acquired using multicomponent sensors over a subsurface formation at 1110, and separating PS observed data from the seismic data at 1120. Multicomponent sensors enable detecting and separating both S-waves and P-waves after P-wave have been injected in the subsurface formation. Techniques of separating PS observed data from the seismic data have previously been discussed.

Method 1100 then includes generating PS synthetic data using acoustic approximation equations in anisotropic media with a P-wave model, a current S-wave velocity model and a reflectivity model as inputs, at 1130 (as already disclosed) and updating the current S-wave velocity model using a full waveform inversion, FWI, to minimize an Amplitude-Discrepancy-Mitigating, ADM, cost function at 1140. The ADM cost function quantifies difference between the PS observed data and the PS synthetic data while alleviating an amplitude mismatch between the PS observed data and the PS synthetic data due to the use of the acoustic approximation equations.

In one embodiment, the ADM cost function is a sum of travel-time differences between the observed and the synthetic PS data (e.g., $J_{TT}$ in equation (8)). In another embodiment, the ADM cost function is a sum of differences between warped synthetic data and the synthetic data, the warped synthetic data being time shifted according to respective time shifts between the synthetic data and the observed data (e.g., $J_{DW}$ in equation (9)).

Method 1100 further includes using the updated S-wave velocity model to assess presence of natural resources in the subsurface formation and/or to assist extraction of the natural resources from the subsurface formation at 1150. This step may include a comparison of a PP image-based reflectivity with a PS image-based reflectivity to identify fluid presence, and/or extracting information about areas under gas filled zones.

As suggested by the dashed arrow, steps 1130 and 1140 performed iteratively until a predetermined criterion related to ADM cost function's minimization is met. In this case, an initial S-model being set as the current S-model at a first iteration and the updated S-wave velocity model being the current S-wave velocity model at a next iteration.

As already discussed, the updating of the current S-wave velocity model may include calculating a cost function gradient with a gradient interpolation between receiver nodes. A preconditioner may be used when calculating the ADM cost function gradient.

Observed PP data may also be separated from the seismic data and processed with RFWI or other methods to obtain the P-wave velocity model. The reflectivity model may be obtained by applying a true amplitude pre-stack depth migration method to the P-wave velocity model.

One embodiment may further or additionally update an anisotropic parameter of S-wave, δ' using FWI. Another embodiment may update the P-wave velocity model while maintaining the current S-wave velocity model fixed.

Figure 12:
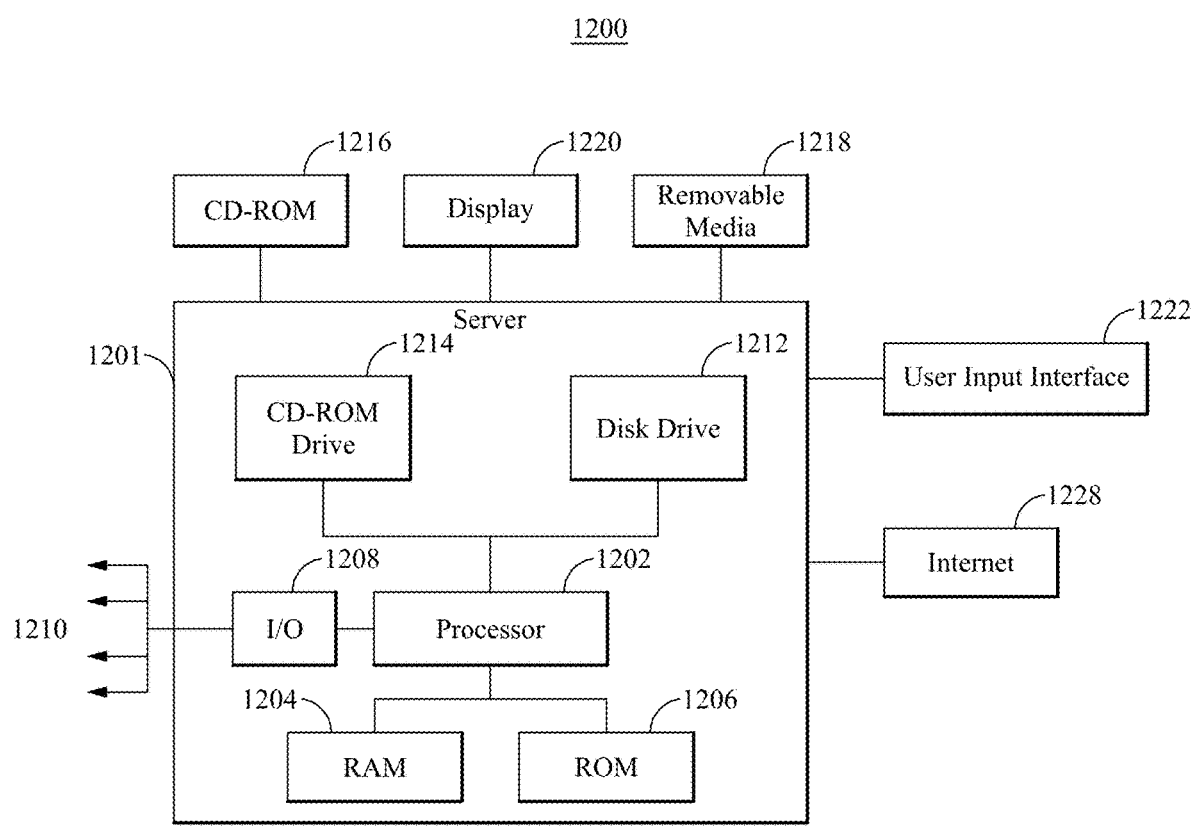
FIG. 12 is a schematic diagram of a seismic data processing apparatus according to an embodiment.

FIG. 12 shows a seismic data processing apparatus 1200 according to an embodiment. Apparatus 1200 is suitable for performing the above-described PS-RFWI seismic data processing. Server 1201 may include a central processor (CPU) 1202 and/or a graphic processor (GPU) coupled to a random-access memory (RAM) 1204 and to a read-only memory (ROM) 1206. ROM 1206 may also be other types of storage media to store programs, such as programmable ROM (PROM), erasable PROM (EPROM), etc. Processor 1202 may communicate with other internal and external components through input/output (I/O) circuitry 1208 and bussing 1210 to provide control signals and the like. Processor 1202 carries out a variety of functions as are known in the art, as dictated by software and/or firmware instructions.

Server 1201 may also include one or more data storage devices, including hard drives 1212, CD-ROM drives 1214 and other hardware capable of reading and/or storing information, such as DVD, etc. In one embodiment, software for carrying out the above-discussed steps may be stored and distributed on a CD-ROM or DVD 1216, a USB storage device 1218 or other form of media capable of portably storing information. These storage media may be inserted into, and read by, devices such as CD-ROM drive 1214, disk drive 1212, etc. Server 1201 may be coupled to a display 1220, which may be any type of known display or presentation screen, such as LCD, plasma display, cathode ray tube (CRT), etc. A user input interface 1222 is provided, including one or more user interface mechanisms such as a mouse, keyboard, microphone, touchpad, touch screen, voice-recognition system, etc.

Server 1201 may be coupled to other devices, such as seismic sources, receivers, seismic data storage units, and may be part of a larger network configuration, such as in a global area network (GAN) like the internet 1228, which allows ultimate connection to various computing devices.

In yet another embodiment, RAM 1204 stores executable codes that, when executed, make processor 1202 perform the PS-RFWI methods according to various embodiments.

The disclosed embodiments provide PS-RFWI methods and apparatuses for processing seismic data acquired using multicomponent sensors. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration, the method comprising:

obtaining seismic data acquired using multicomponent sensors able to detect P-waves and S-waves emerging from a subsurface formation after P-waves have been injected therein, the detected P-waves being recorded as PP observed data and the detected S-waves being recorded as PS observed data, respectively;

separating the PS observed data from the seismic data;

generating PS synthetic data using acoustic approximation equations in anisotropic media with a P-wave model, a current S-wave velocity model and a reflectivity model as inputs;

updating the current S-wave velocity model using a full waveform inversion, FWI, to minimize an amplitude-discrepancy-mitigating, ADM, cost function quantifying difference between the PS observed data and the PS synthetic data while alleviating an amplitude mismatch between the PS observed data and the PS synthetic data due to the use of the acoustic approximation equations; and using the updated S-wave velocity model to assess presence of natural resources in the subsurface formation and/or to assist extraction of the natural resources from the subsurface formation.

2. The method of claim 1, wherein the generating of the PS synthetic data and the updating of the current S-wave velocity model are performed iteratively until a predetermined criterion related to ADM cost function's minimization is met, an initial S-model being set as the current S-model at a first iteration and the updated S-wave velocity model being the current S-wave velocity model at a next iteration.

3. The method of claim 1, wherein the ADM cost function is a sum of travel-time differences between the observed and the synthetic PS data.

4. The method of claim 1, wherein the ADM cost function is a sum of differences between warped synthetic data and the synthetic data, the warped synthetic data being time shifted according to respective time shifts between the synthetic data and the observed data.

5. The method of claim 1, wherein the updating of the current S-wave velocity model includes calculating a cost function gradient with a gradient interpolation between receiver nodes.

6. The method of claim 5, wherein an interpolation window length is determined according to receiver spacing and size of model grid used by the FWI.

7. The method of claim 5, wherein the gradient interpolation uses a sinc function.

8. The method of claim 1, wherein the updating of the current S-wave velocity model includes calculating a cost function gradient that uses a preconditioner.

9. The method of claim 1, wherein the observed PP data are also separated from the seismic data, the method further comprising generating the P-wave velocity model based on the observed PP data.

10. The method of claim 1, further comprising:
obtaining the reflectivity model by applying a true amplitude pre-stack depth migration method to the P-wave velocity model.

11. The method of claim 1, wherein the using of the updated S-wave velocity model includes a comparison of a PP image-based reflectivity obtained using the PP data with a PS image-based reflectivity obtained using the PS data to identify fluid presence, and/or extracting information about areas under gas filled zones.

12. The method of claim 1, further comprising:
updating an anisotropic parameter of S-wave, $\delta'$ using FWI.

13. The method of claim 1, further comprising:
updating the P-wave velocity model while maintaining the current S-wave velocity model fixed.

14. A seismic data processing apparatus, comprising:
an interface configured to obtain seismic data acquired using multicomponents sensors able to detect P-waves and S-waves emerging from a subsurface formation after P-waves have been injected therein, the detected P-waves being recorded as PP observed data and the detected S-waves being recorded as PS observed data, respectively; and
a data processing unit connected to the interface and configured
to separate the PS observed data from the seismic data;
to generate PS synthetic data using acoustic approximation equations in anisotropic media with a P-wave model, a current S-wave velocity model and a reflectivity model as inputs; and
to update the current S-wave velocity model using a full waveform inversion, FWI, to minimize an amplitude-discrepancy-mitigating, ADM, cost function quantifying difference between the PS observed data and the PS synthetic data while alleviating an amplitude mismatch between the PS observed data and the PS synthetic data due to the use of the acoustic approximation equations,
wherein the updated S-wave velocity model is usable to assess presence of natural resources in the subsurface formation and/or to assist extraction of the natural resources from the subsurface formation.

15. The seismic data processing apparatus of claim 14, wherein the data processing unit generates of the PS synthetic data and updates the current S-wave velocity model iteratively until a predetermined criterion related to ADM cost function's minimization is met, an initial S-model being set as the current S-model at a first iteration, and the updated S-wave velocity model being the current S-wave velocity model at a next iteration.

16. The seismic data processing apparatus of claim 14, wherein the ADM cost function is a sum of travel-time differences between the observed and the synthetic PS data, or the ADM cost function is a sum of differences between warped synthetic data and the synthetic data, the warped synthetic data being time shifted according to respective time shifts between the synthetic data and the observed data.

17. The seismic data processing apparatus of claim 14, wherein, when updating of the current S-wave velocity model, the data processing unit calculates a cost function gradient and interpolates the cost function gradient between receiver nodes.

18. The seismic data processing apparatus of claim 17, wherein the data processing unit uses a preconditioner when calculating the cost function gradient.

19. The seismic data processing apparatus of claim 14, the data processing unit is further configured to update an anisotropic parameter of S-wave, $\delta'$ and/or to update the P-wave velocity model while maintaining the current S-wave velocity model fixed.

20. A non-transitory computer readable medium storing executable codes which, when executed on a computer make the computer perform a method for seismic exploration comprising:
obtaining seismic data acquired using multicomponent sensors able to detect P-waves and S-waves emerging from a subsurface formation after P-waves have been injected therein, the detected P-waves being recorded as PP observed data and the detected S-waves being recorded as PS observed data, respectively;
separating the PS observed data from the seismic data;
generating PS synthetic data using acoustic approximation equations in anisotropic media with a P-wave model, a current S-wave velocity model and a reflectivity model as inputs;
updating the current S-wave velocity model using a full waveform inversion, FWI, to minimize an amplitude-discrepancy-mitigating, ADM, cost function quantifying difference between the PS observed data and the PS synthetic data while alleviating an amplitude mismatch between the PS observed data and the PS synthetic data due to the use of the acoustic approximation equations; and
using the updated S-wave velocity model to assess presence of natural resources in the subsurface formation and/or to assist extraction of the natural resources from the subsurface formation.

* * * * *